United States Patent [19]
Collmann

[11] Patent Number: 6,085,095
[45] Date of Patent: Jul. 4, 2000

[54] METHOD FOR DETERMINING THE SPATIAL DISTRIBUTION OF THE TRAFFIC VOLUME WITHIN A MOBILE RADIO COMMUNICATIONS NETWORK

[75] Inventor: Ralf Collmann, Stuttgart, Germany

[73] Assignee: Alcatel, Paris, France

[21] Appl. No.: 09/023,409

[22] Filed: Feb. 12, 1998

[30] Foreign Application Priority Data

Feb. 14, 1997 [DE] Germany .................... 197 05 903

[51] Int. Cl.[7] ....................................... H04Q 7/20
[52] U.S. Cl. .................... 455/453; 455/456; 455/446
[58] Field of Search .................... 455/456, 457, 455/453, 226.2, 67.4, 67.6, 422, 435, 423, 446

[56] References Cited

U.S. PATENT DOCUMENTS

| | | | |
|---|---|---|---|
| 5,293,645 | 3/1994 | Sood .................................. | 455/456 |
| 5,418,843 | 5/1995 | Stjernholm . | |
| 5,475,870 | 12/1995 | Weaver, Jr. et al. . | |
| 5,537,460 | 7/1996 | Hollyday, Jr. et al. .................. | 379/59 |
| 5,561,839 | 10/1996 | Osterberg et al. ..................... | 455/56.1 |
| 5,584,049 | 12/1996 | Weaver, Jr. et al. . | |
| 5,657,487 | 8/1997 | Doner .................................. | 455/456 |
| 5,828,926 | 10/1998 | Ho-A-Chuck .......................... | 455/446 |
| 5,903,843 | 3/1999 | Suzuki et al. ......................... | 455/453 |

FOREIGN PATENT DOCUMENTS

| | | |
|---|---|---|
| 0615395 | 9/1994 | European Pat. Off. . |
| WO 94/06222 | 3/1994 | WIPO . |
| 9427384 | 11/1994 | WIPO . |
| 9509513 | 4/1995 | WIPO . |
| 9635305 | 11/1996 | WIPO . |
| WO 97/39598 | 10/1997 | WIPO . |

OTHER PUBLICATIONS

"Digital Cellular Traffic Hotspot Detector", Motorola Product Brochure, Motorola, European Cellular Infrastructure Division, Swindon, U.K.

Primary Examiner—Edward F. Urban
Assistant Examiner—Tilahun Gesesse
Attorney, Agent, or Firm—Ware, Fressola, Van Der Sluys & Adolphson LLP; Milton Oliver

[57] ABSTRACT

For determining the spatial distribution of the traffic volume within a radio cell of a cellular mobile radio communications network, a test signal transmitter is usually installed at a test location. Each mobile station which receives the test signal, measures and reports the receive level to a computer for evaluating the test location. The test location is deemed to be suitable for the installation of a new base station if the majority of the mobile stations receives a test signal of sufficient strength. In order to provide a simple method for determining the spatial distribution, it is proposed to first subdivide the radio cell (RC1) into several segments or sections (A1, A2, A3, . . . , D4) and to associated respective reference values (e.g. reference receive levels) with these segments or sections. The reference values are calculated with the help of a Radio Communications Network Planning Tool, wherein the distances from the segment or section (C2) to at least two of the base stations (BS1, BS2) can be derived from the reference values. Subsequently, measured values (e.g. the actual receive level) which depend on the length of the radio transmission paths, are determined for each mobile station (MS). After the reference values are compared with the actual values, the respective segment or section (C2) in which the mobile station (MS) is currently located, is determined. A counter state indicating the traffic volume in this segment or section (C2) is then incremented for this segment (C2). A test signal transmitter is not required, because that section (C2) of the cell which has the highest count state, representing the highest traffic volume, has been shown to be a desirable location for a reliever base station, without having to put a test transmitter there.

10 Claims, 3 Drawing Sheets

| DS | RL1 | RL2 | RL3 | RL4 | RL... | CNT |
|---|---|---|---|---|---|---|
| A1 | −20 | −50 | −54 | −62 | | ⦀⦀ I |
| A1 | −18 | −48 | −52 | −61 | | I |
| ⋮ | ⋮ | | | | | II |
| B1 | −19 | −48 | −51 | −59 | | ⦀⦀ IIII |
| ⋮ | ⋮ | | | | | III |
| C1 | −22 | −46 | −48 | −59 | | I |
| C2 | −19 | −44 | −49 | −58 | ... | ⦀⦀ ⋮ |
| ⋮ | ⋮ | | | | | |

↳ REG

| ID | −21 | −43 | −50 | −56 | ... |
|---|---|---|---|---|---|
| | M1 | M2 | M3 | M4 | |

↳ DS'

# METHOD FOR DETERMINING THE SPATIAL DISTRIBUTION OF THE TRAFFIC VOLUME WITHIN A MOBILE RADIO COMMUNICATIONS NETWORK

BACKGROUND OF THE INVENTION

1. Technical Field

The invention relates to a method for determining the spatial distribution of the traffic volume within a radio cell of a cellular mobile radio communications network as well as a computation unit for carrying out the method and a mobile radio communications network including the computation unit.

2. Discussion of Related Art

From the product information "Digital Cellular Traffic Hotspot Detector" by the company Motorola, Swindon, Great Britain, there is known a method of this type for determining the traffic volume within a radio cell of a cellular mobile radio communications network operating according to the GSM standard (GSM: Global System for Mobile Communications). In the method "Hotspot Detection" described therein, a test signal transmitter is placed at a test location in the service area of the mobile radio communications network. A test signal is subsequently transmitted by the test signal transmitter and then received by the mobile stations located in the service are of the mobile radio communications network. Each of the mobile stations which receives the test signal, measures and reports the receive level to the current base station ("base station currently serving the cell"). In a computer connected to the base station, the receive levels reported by several mobile stations are evaluated in order to determine, if the test location is suitable for establishing a base station. As described therein, the test location is judged to be suitable if the test signal received by the majority of the mobile stations is stronger than a broadcast sent by the current base station. Consequently, according to methods known in the art, a test signal transmitter has to be used and placed at a test location. Moreover, the test signal transmitter has to transmit a test signal which can be suitably received by the mobile stations.

SUMMARY OF INVENTION

It is an object of the invention to simplify the afore-described method by eliminating the test signal transmitter. There is also provided a computation unit facilitating the implementation of the method and a mobile radio communications network incorporating the computation unit.

According to a first aspect of the invention, a method for determining spatial distribution of traffic volume within a radio cell of a cellular mobile radio communications network with base stations, with each of the base stations servicing a respective one of the radio cells comprises the steps of determining for each mobile station within the radio cell at least two measured values which depend on lengths of radio transmission paths between the mobile station and the at least two of the base stations wherein the radio cell is subdivided into several segments wherein with each segment there is associated a reference or target data set comprising at least two reference or target values which indicate for spatial coordinates of the segment radio transmission conditions for radio transmission paths to at least two of the base stations for deriving a spatial separation from the segment to the at least two of the base stations comprises the steps of forming from the measured values an actual data set, comparing said actual data set with the reference data sets, wherein each of reference data sets is associated with exactly one of the segments, indicating a segment with a reference data set which is in closest agreement with the actual data set, and incrementing, for the indicated segment, a counter setting which represents traffic volume in the indicated segment.

According to a second aspect of the invention, a computation unit for determining the spatial distribution of the traffic volume within a radio cell of a cellular mobile radio communications network, is characterized in that the radio cell is subdivided into several segments, that the computation unit is connected with base stations with each base station servicing a respective one of the radio cells, that the computation unit is connected to a database storing reference data sets, with each of the reference data set associated with exactly one of the segments and comprising at least two reference values which indicate for the spatial coordinates of the segment radio transmission conditions for radio transmission paths to at least two of the base stations and which make it possible to derive the spatial separation from the segment to the at least two of the base stations, that the computation unit for each mobile station within the radio cell forms at least one actual data set from at least two measured values which depend on the lengths of the radio transmission paths between the mobile station and the at least two base stations, and compares the actual data set with the reference data sets, and that the computation unit indicates the respective segment whose reference data set is in closest agreement with the actual data set, and increments for the respective segment a counter setting which represents the traffic volume for the respective segment.

According to a third aspect of the invention, a mobile radio communications network with a computation unit for determining the spatial distribution of the traffic volume within a radio cell of a cellular mobile radio communications network, characterized in that the radio cell is subdivided into several segments, that the computation unit is connected with base stations, with each base station servicing a respective one of the radio cells, that the computation unit is connected to a database for storing reference data sets, with each of the reference data set associated with exactly one of the segments and comprising at least two reference values which indicate for the spatial coordinates of the segment radio transmission conditions for radio transmission paths to at least two of the base stations and which make it possible to derive the spatial separation from the segment to the at least two of the base stations, that the computation unit for each mobile station within the radio cell forms at least one actual data set from at least two measured values which depend on the lengths of the radio transmission paths between the mobile station and the at least two base stations, and compares the actual data set with the reference data sets, and that the computation unit indicates the respective segment whose reference data set is in closest agreement with the actual data set, and increments for the respective segment a counter setting which represents the traffic volume for the respective segment.

Accordingly, the computation unit is used to first subdivide the radio cell which is to be tested, into several sections, wherein with each section there is associated a reference data set comprising at least two reference values which indicate for the spatial coordinates of the section, the radio propagation requirements for radio transmission paths to at least two of the base stations; the spatial separation between the segment and the at least two base stations can be derived from these reference values.

Subsequently, for each mobile station within the radio cell, there are determined at least two measured values which depend on the lengths of the radio transmission paths between the mobile station and the at least two base stations. An actual data set is subsequently formed from the measured values and compared with the reference data sets, with each of reference data sets associated with exactly one of the segments, and the segment containing the reference data set which is in closest agreement with the actual data set, is indicated. A counter setting representing the traffic volume in the segment is then incremented for the indicated segment.

DETAILED DESCRIPTION OF PREFERRED EMBODIMENTS

Figure 1A:
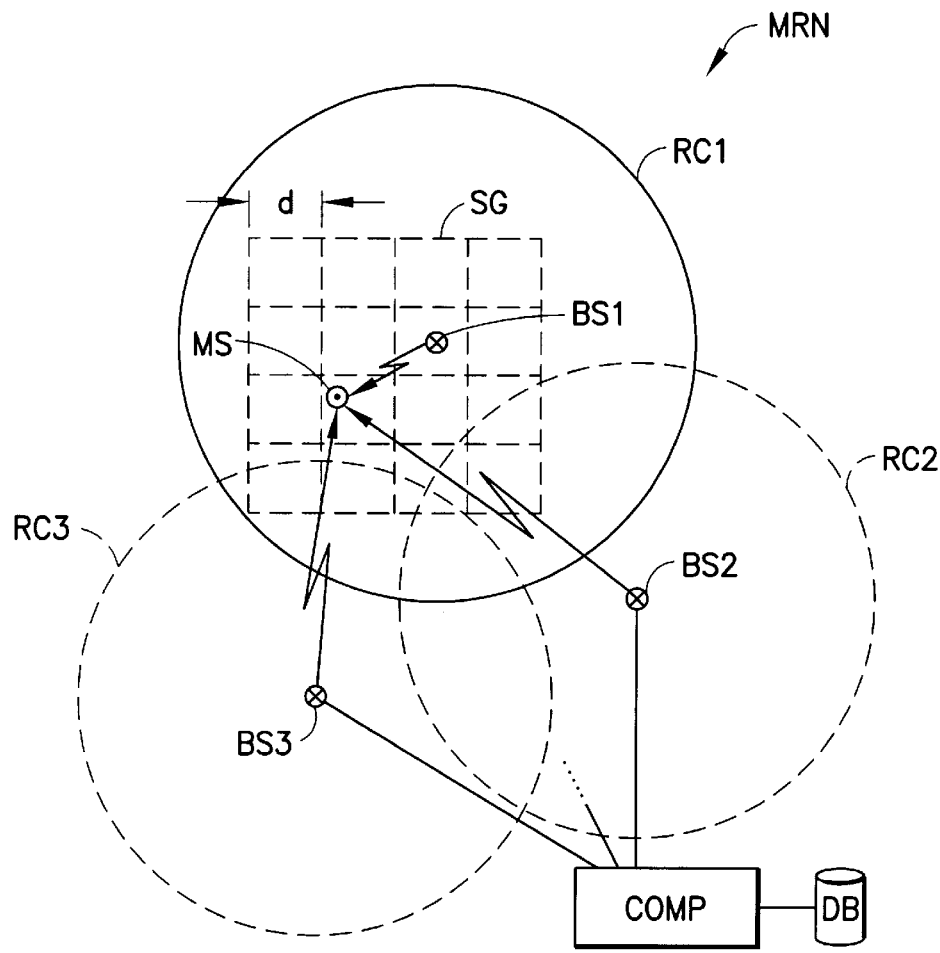
FIG. 1a illustrates three radio cells of a mobile radio network, served by three respective base stations (BS), and a sectional grid (SG) within one of the cells.
Figure 1B:
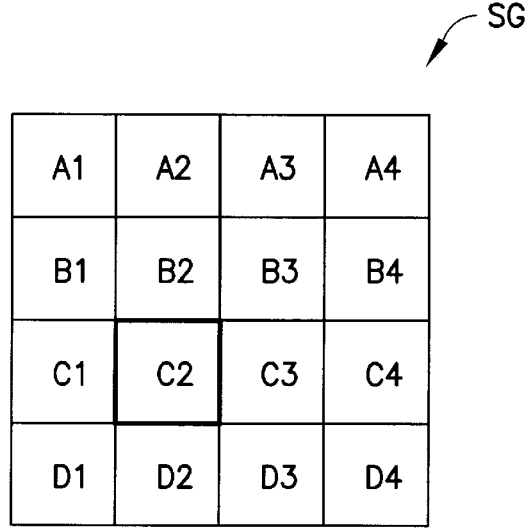
FIG. 1b is an enlarged view of the sectional grid.

FIG. 1a illustrates schematically the organization of a cellular mobile radio communications network MRN comprising several radio cells RC1 to RC3 which are serviced by base stations BS1 to BS3. The base stations are connected to a computation unit COMP which will be described below and which is connected to a database DB. It is the object to determine the spatial distribution of the traffic volume within the radio cell RC1. At this moment, several mobile stations are located in the radio cell RC1, which is serviced by the base station BS1, with only one of the mobile stations MS illustrated as an example. In order to determine the number and the exact location of mobile stations located within the radio cell RC1, the radio cell RC1 is subdivided into several segments. In FIG. 1a, there is shown by way of example a group of segments SG which consists of 16 grid squares, each side of a square having a length of d=20 m. Accordingly, in the present example, the radio cell RC1 which in general has a diameter of about 15 to 30 km, is subdivided into small grid squares, with each grid square only covering an area of 20 m×20 m. The group of grid squares SG is denoted in FIG. 1a by dashed lines and covers only a portion of the area of the entire radio cell RC1. As shown in FIG. 1b, the group of segments SG consists of the following segments: A1 to A4, B1 to B4, C1 to C4 and D1 to D4. The segments in this example have the shape of squares and are therefore also called grid squares A1 to D4. Other shapes are also feasible, such as a honeycomb shape.

In the following, the grid square C2 will be considered more closely: With the grid square C2, as with any other grid square, there is associated a reference data set comprising at least two reference values which are stored in the database DB. The reference values are determined with the help of a computer which contains a program for planning a radio communications network. Computers of this type are known to the artisan under the name "Radio Communications Network Planning Tools". The associated programs calculate the radio wave propagation based on supplied models, for example based on the known model by Walfish and Ikegami. For the spatial coordinates of the grid square, the reference values provide the propagation conditions, e.g. the reference receive level, for radio waves to at least two of the base stations. The distances from the grid square to the at least two base stations can be derived from the reference values.

The following data for each of the grid squares are stored in the database DB:

A reference data set DS comprising at least two reference values RL1 to RL4, and a counter CNT indicating the traffic volume in the respective grid square. In the present example, the stored reference values are the receive levels, which are expected to be received in the respective grid square. Among those levels is the receive level RL1, which is generated by the radio signals originating from the base station BS1, the receive level RL2, which is generated by the radio signals originating from the base station BS2, etc. For example, the following reference values (receive levels) are stored in the database DB for the grid square C2: RL1=−19 dBm, RL2=−44 dBm, RL3=−49 dBm and RL4=−58 dBm. The receive levels are reduced by attenuation along the radio transmission paths, so that each receive level corresponds to a measure for the actual spatial separation between the grid square C2 and the respective base station. The reference data set DS therefore uniquely characterizes each grid square. It will be described below, how to determine the grid square in which the mobile stations are located, so that the spatial distribution of the traffic volume can be determined.

The segment or section (grid square) in which each mobile station, i.e. also the mobile station MS depicted in FIG. 1a, is presently located, is determined with the method described below.

After the method has been applied to a large number of mobile stations, the segments or sections with the highest density of mobile stations can be identified by statistical methods.

Figures 2A, 2B:
FIG. 2a is an example of expected (reference) signal values in respective sections, and respective counts of calls therein.
FIG. 2b is an example of a data record transmitted by a mobile station (cellphone), including an ID code and measured signal values.

Initially, an actual data set DS' is generated, as shown schematically in FIG. 2b. The actual data set DS' comprises at least two measured values M1, M2, M3 and M4, which depend on the lengths of the radio transmission paths between the mobile station MS and the base stations BS1, BS2, . . . In the present example, the measured values correspond to the receive levels of those radio signals which are currently received by the mobile station MS along the various radio transmission paths. For example, the base station BS1 generates at the location of the mobile station MS a receive level of M1=−21 dBm. The base station BS2 generates a receive level of M2=−43 dBm and the base station BS3 generates a receive level of M3=−50 dBm. An additional base station (not shown) generates a receive level of M4=−56 dBm. The receive levels M1 to M4 are measured by the mobile station MS and transmitted as measured values to the current base station BS1 (serving base station). The measured values are then transmitted to a radio base station controller (not shown) operating with a conventional signaling protocol (e.g. MAP-Protocol via the Abis-Interface in the GSM standard). From these measured values, a protocol analyzer (not shown) generates input data for a computation unit COMP connected to the radio communications network. The input data with the measured values M1 to M4 form the actual data set DS' depicted in FIG. 2b which also includes an identification field ID containing a record for identifying the mobile station. Based on an actual data set of this type, the computation unit COMP (see FIG. 1a) can then carry out for each mobile station the method of FIG. 3 described in the following.

Figure 3:
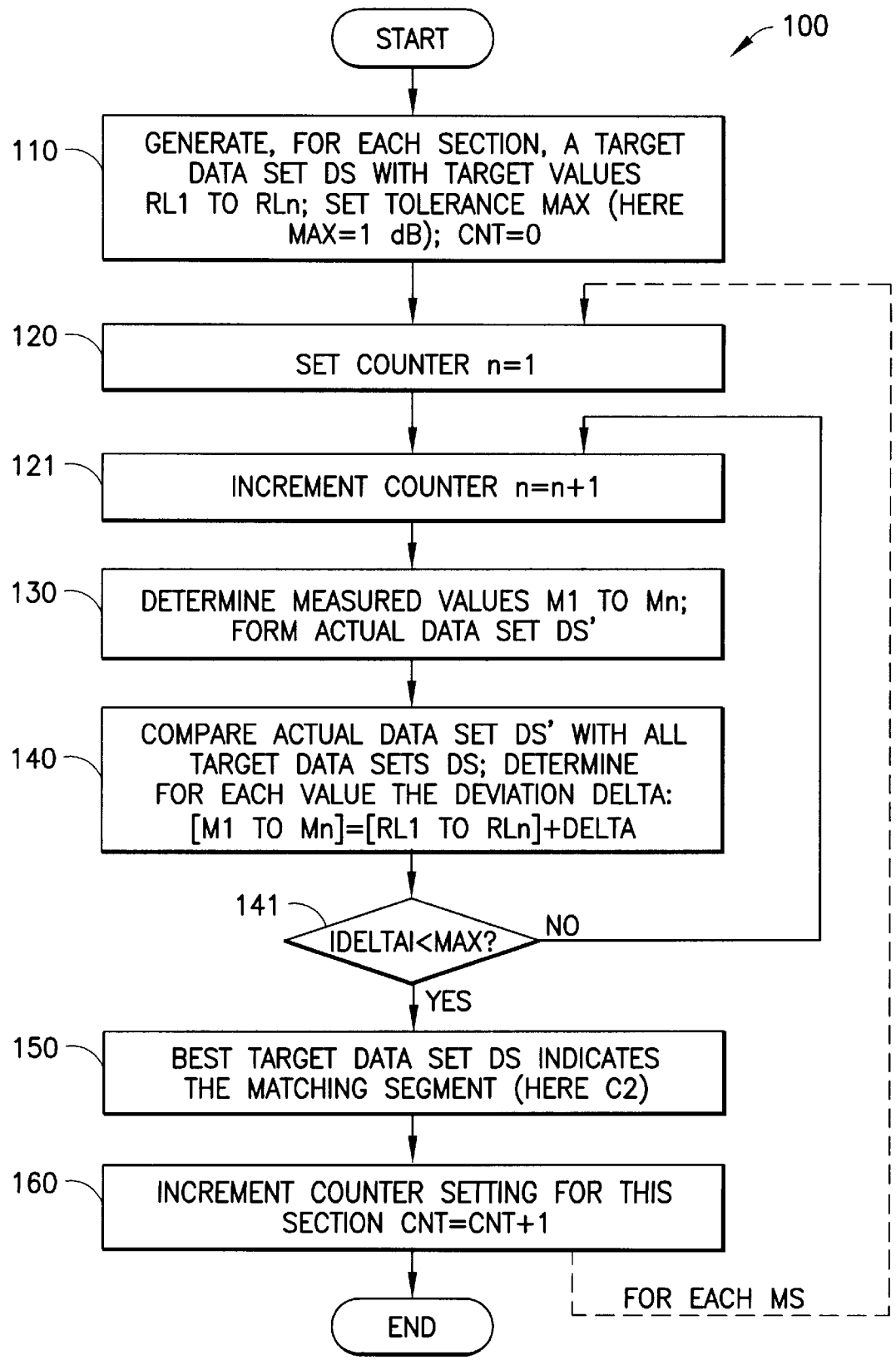
FIG. 3 is a flowchart of the automated hotspot detection program of the present invention.

In FIG. 3, there is illustrated by way of an example a block circuit diagram for a method 100 for determining the spatial distribution of the traffic volume within the radio cell RC1 illustrated in FIG. 1a. The method is described below in exemplary form for all mobile stations based on an evaluation of the actual data set DS' which is associated with the mobile station MS.

After the start of the method 100, in a first step a reference data set DS is generated for each of the segments (see also FIG. 1b). Each reference data set contains at least two reference values RL1 to RLn (n≧2), which were calculated with the help of the Radio Communications Network Planning Tool and from which the distances between the mobile station MS and the base stations can be derived. As already described above with reference to FIG. 2a, the reference data set DS contains for the segment C2 the following reference values, which correspond to the expected receive levels: RL1=−19 dBm, RL2=−44 dBm etc. The counter is set to CNT=0. In step 110 a tolerance MAX is preset, which is a measure of the allowed deviation between the actual values and the reference values. In the present example, MAX=1 dB. In a subsequent step 120, a counter n is set to 1. In a subsequent step 121, the value n in the counter is incremented by 1 (n=n+1). The counter n indicates the number of measured values to be compared with the reference values. Initially, n=2.

In a next step 130, the measured values M1 to Mn (n>2) are determined, and an actual data set DS' is formed from these values. In the example of FIG. 2b, an actual data set DS' is formed for the mobile station MS. In the illustrated example, measured values are initially transmitted individually from the mobile station to the radio communications network, whereafter the actual data set DS' is created inside the protocol analyzer (not shown) which is connected to the computation unit COMP.

The actual data set can conceivably also be generated by the mobile station and subsequently be transmitted to the radio communications network.

In a subsequent step 140, the actual data set DS' is compared with all reference data sets DS. The goal is to determine which of the reference data sets is in closest agreement with the actual data set, i.e. which of the reference data sets has the strongest correlation with the actual data set. Each data set forms a multi-digit tupel. In order to simplify a comparison, the tupel first consists only of two numerical values, i.e. the actual data set DS' contains the measured values M1 and M2 and the reference data sets DS contain the reference values RL1 and RL2. In this case, the counter n is initially set to n=2. The deviation between the actual values from the reference values is determined by comparing the reference and actual values. The deviation DELTA is determined and compared in another step 141 with the maximum permitted tolerance MAX. If DELTA is greater than or equal to MAX, then the process starts again with step 121 and the calculation is performed with a larger value of n, i.e. now with three-digit tupels. If the absolute value of DELTA is smaller than the tolerance MAX, i.e. smaller than 1 dB, then the last compared reference data set DS is listed in the next step 150, together with the segment associated with the respective reference data set DS. In the present example, the measured values M1 and M2 correlate most strongly with the reference values RL1 and RL2 of the data set DS, which is associated with the segment C2. Consequently, the mobile station MS is presumably located in this segment C2. In a subsequent step 160, the counter setting for this segment is incremented (CNT=CNT+1). The counter setting for this segment C2 thus indicates that in addition to the original five mobile stations, there is an additional mobile station MS located in this segment (see also FIG. 2a).

The steps 120 to 160 are repeated for each mobile station within the radio cell RC1. After a predetermined time interval, e.g., after several hours, each of the segments A1 to D4 shows a certain counter setting CNT. As illustrated in FIG. 2a, the segment B1 has the highest counter setting with CNT=9. The segments A1 and C2 also exhibit high counter settings CNT=5 and 6, respectively. If all counter settings are polled after the predetermined time interval, then the segment with the highest traffic load can be immediately identified.

The counter setting CNT thus reflects the spatial distribution of the traffic volume within the radio cell RC1. If a new base station is to be established within the radio cell, the segment with the highest counter setting and consequently the highest traffic load is selected. In the present example, the segment B1 with CNT=9 is particularly suited for locating a new base station.

In the aforedescribed embodiment, the measured values and reference values which are compared with each other, are the receive levels. The receive levels depend on the path loss along the radio transmission paths between the mobile station and the base stations, i.e. the receive levels are a measure of the distance between the mobile station and the base stations. Spatial coordinates can be calculated based on these receive levels. Consequently, the segment in which a mobile station is located, can be determined. Instead of receive levels, signal propagation times along the radio transmission paths could conceivably also be evaluated and compared with each other. Most advantageously, both the receive levels and the signal propagation times could be analyzed, so that the spatial distribution of the traffic volume can be computed with a high accuracy. The accuracy for calculating the traffic volume can be improved by increasing the number of measured values and reference values which are compared with each other, i.e. instead of comparing only two values, more than two values are compared. This is accomplished by iteratively incrementing the counter n each time by 1 (see step 121 in FIG. 3).

According to the version described above, the measured values are determined by the respective mobile station and transmitted to the computation unit COMP. Conceivably, the measured values can also be determined on the side of the mobile radio network, i.e. by measuring the receive levels or signal propagation times in the base stations.

The radio cell analyzed in the embodiment was subdivided in quadratic segments (grid squares). The subdivision of the radio cell advantageously uses an existing radio communications network planning tool wherein a radio cell is subdivided into grid squares with dimensions of 20×20 m. The data for the grid squares can be copied from the radio communications network planning tool and stored in the database. It is also possible to select differently shaped segments for subdividing the radio cell, such as honeycomb-shaped segments. The size of the segments is here selected to be 20×20 m. If larger segments are used for calculating the traffic volume, then the computational load for the computation unit is reduced. However, the increased size of the segments simultaneously reduces the spatial resolution of the computational method. Both the computational load and the computational accuracy can be optimized simultaneously by adjusting the size of the segments accordingly.

In the present example, the computation unit is a so-called workstation which is connected with the base stations via a base station controller (not shown) to which a protocol analyzer is connected. When a protocol analyzer is used, the measured values are advantageously provided in the form of an actual data set, which can be used directly and without changes for evaluation and for a comparison with the reference data sets. Instead of connecting the computation unit directly with the protocol analyzer and the base station controller, the computation unit can also be connected with the base station controller via a long-distance data link (e.g. via ISDN) or via a mobile radio exchange of the radio communications network. As a result, the computation unit need not necessarily form a part of the mobile radio network.

The description of the embodiment is based on almost ideal conditions for radio transmission, i.e. on predominantly line-of-sight connections between the mobile station and the base stations. In order to apply the aforedescribed method also in situations where a line-of-sight connection generally does not exist (e.g., with radio shadows caused by buildings), the measured values could conceivably be increased by a constant level which would approximately correspond to the attenuation expected from such radio shadows. In these situations, the measured values could be corrected by a so-called attenuation offset. This offset can be determined by first measuring the propagation times and then calculating from the propagation times the segment with the expected location of the mobile station. The receive levels determined by the mobile station are then compared with reference receive levels which are expected to be measured within the respective segment. The offset can be determined from a comparison between the actual values and the reference values and can be used for future calculations.

In the embodiment, the method of the invention was used for computing the locations for establishing new for base stations to relieve base stations already in existence. Relief can also be obtained by installing so-called repeaters or antennae which are spatially offset.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method (100) of determining spatial distribution of traffic volume within respective radio cells (RC1 . . . ) of a cellular mobile radio communications network (MRN) with a plurality of base stations (BS1, BS2, BS3), which each serve a respective one of the radio cells (RC1, RC2, RC3), the method comprising the steps of:

determining (130), for each mobile station (MS) within the radio cell (RC1), at least two measured values (M1, M2) which depend on lengths of respective radio transmission paths from the mobile station (MS) to said at least two base stations (BS1, BS2), wherein the radio cell (RC1) is subdivided into several sections (A1, A2, A3, . . . B1, B2, . . . ) wherein with each section (C2) there is associated a reference data set (DS) comprising at least two reference values (RL1, RL2) which specify, for spatial coordinates of the section (C2), radio propagation requirements for radio transmission paths to at least two of the base stations (BS1, BS2), said reference values being characteristic of respective spatial separations from the section (C2) to the at least two base stations (BS1, BS2);

forming (140) from the measured values (M1, M2) an actual data set (DS'), comparing said actual data set with the reference data sets (DS), wherein each of said reference data sets (DS) is associated with exactly one of the sections (A1, A2, A3, . . . B1, B2, . . . );

determining (150) which section (C2) has a reference data set (DS) which most closely matches the actual data set (DS') ; and incrementing (160), for the matching section (C2), a counter state (CNT) which represents traffic volume in the matching section (C2).

2. A method according to claim 1, further comprising the step of comparing, after a presettable time interval, counter states (CNT) for the respective sections (A1, A2, A3, . . . B1, B2, . . . ), representing respective traffic volumes therein, and identifying that section (B1) with a highest counter state (CNT) as a desirable location for a new base station for the mobile radio communications network (MRN).

3. A method according to claim 1, wherein said step of determining (130) the measured values comprising measuring signal strength receive levels (M1, M2) which are reduced by attenuation along the radio transmission paths, and thus are a function of the lengths of the paths.

4. A method according to claim 1, wherein said step of determining (130) the measured values comprises measuring signal propagation times of radio signals transmitted on respective radio transmission paths.

5. A method according to claim 1, further comprising the steps of determining the measured values (M1, M2) of each mobile station (MS) (130) when radio signals transmitted by the base stations (BS1, BS2) are received, and subsequently transmitting the measured values to the base station (BS1) which services the radio cell (RC1), and feeding the measured values (M1, M2) as input data to a computation unit (COMP) which is connected to the base station (BS1) and determines mobile station location therefrom.

6. A method according to claim 5, wherein the input data formed from the measured values (M1, M2) are combined in the computation unit (COMP) into the actual data set (DS'), and wherein the actual data set (DS') is compared in the computation unit (COMP) with a reference data set (DS) whose reference values (RL1, RL2) are stored in a database (DE).

7. A computation unit (COMP) for determining the spatial distribution of traffic volume within a radio cell (RC1) of a cellular mobile radio communications network (MRN), wherein the radio cell (RC1) is subdivided into a plurality of sections (A1, A2, A3, . . . B1, B2, . . . ) wherein the computation unit (COMP) is connected with base stations (BS1, BS2, BS3) with each base station servicing a respective radio cell (RC1, RC2, RC3), the computation unit (COMP) is connected to a database (DB) storing reference data sets (DS), with each reference data sets (DS) uniquely identifying one of the sections (C2) and comprising at least two reference values (RL1, RL2) which indicate, for the spatial coordinates of the section (C2), radio transmission conditions for radio transmission paths to at least two of the base stations (BS1, BS2) and which make it possible to derive the spatial distances from the section (C2) to the at least two base stations (BS1, BS2), the computation unit (COMP) within the radio cell (RC1) forms, for each mobile station, at least one actual data set (DS') from at least two measured values (M1, M2) which depend on the respective lengths of the radio transmission paths between the mobile station (MS) and the at least two base stations (BS1, BS2), and compares the actual data set (DS') with the reference data sets (DS), and the computation unit (COMP) indicates the respective section (C2) whose reference data set (DS) is in closest agreement with the actual data set (DS'), thereby locating the mobile station, and increments for the respective section (C2) a counter state (CNT) which represents the traffic volume for the respective section.

8. A computation unit (COMP) according to claim 7, which after a presettable time interval compares the counter states (CNT) for the sections (A1, A2, A3, B1, B2, . . . ) with each other and identifies a section having a highest counter state (CNT) as a desirable location for a base station to be added to the mobile radio communications network (MRN).

9. A mobile radio communications network (MRN) with a computation unit (COMP) for determining the spatial distribution of the traffic volume within a radio cell (RC1) of a cellular mobile radio communications network (MRN), wherein the radio cell (RC1) is subdivided into a plurality of sections (A1, A2, A3, . . . B1, B2, . . . ), the computation unit (COMP) is connected with base stations (BS1, BS2, BS3), with each base station servicing a respective radio cell (RC1, RC2, RC3), the computation unit (COMP) is connected to a database (DB) for storing reference data sets (DS), with each of the reference data sets (DS) uniquely identifying one of the sections (C2) and comprising at least two reference values (RL1, RL2) which indicate, for the spatial coordinates of the section (C2), radio transmission conditions for radio transmission paths to at least two of the base stations (BS1, BS2) and which make it possible to derive the respective spatial separations from the section (C2) to the at least two base stations (BS1, BS2), the computation unit (COMP), for each mobile station (MS) within the radio cell (RC1), forms at least one actual data set (DS') from at least two measured values (M1, M2) which depend on the lengths of the radio transmission paths between the mobile station (MS) and the at least two base stations (BS1, BS2), and compares the actual data set (DS') with the reference data sets (DS), and the computation unit (COMP) indicates that respective section (C2) whose reference data set (DS) is in closest agreement with the actual data set (DS'), and increments, for the respective section (C2), a counter state (CNT) which represents the traffic volume for the respective section.

10. A mobile radio communications network (MRN) according to claim 9, wherein, after a presettable time interval, the computation unit (COMP) compares the respective counter states (CNT) for the sections (A1, A2, A3, . . . B1, B2, . . . ) with each other and identifies the respective section (B1) with the highest counter state (CNT) as a desirable location for a base station to be added to the mobile radio communications network (MRN).

* * * * *

UNITED STATES PATENT AND TRADEMARK OFFICE
CERTIFICATE OF CORRECTION

PATENT NO. : 6,085,095
DATED : July 4, 2000
INVENTOR(S) : Collmann

It is certified that error appears in the above-identified patent and that said Letters Patent is hereby corrected as shown below:

At column 8, claim 6, line 7 "(DE)" should be
--(DB)--.

At column 8, claim 7, line 5 after "(A1,A2,A3 ...)"
--,-- should be inserted.

Signed and Sealed this

Seventeenth Day of April, 2001

NICHOLAS P. GODICI

Attest:

Attesting Officer    Acting Director of the United States Patent and Trademark Office